Patented Aug. 23, 1932

1,873,061

UNITED STATES PATENT OFFICE

WALTER O. SNELLING AND RICHARD N. BOYD, OF ALLENTOWN, PENNSYLVANIA, ASSIGNORS TO TROJAN POWDER COMPANY, A CORPORATION OF NEW YORK

METHOD OF TREATING CARBOHYDRATE ESTERS

No Drawing.     Application filed December 15, 1930.  Serial No. 502,621.

Our invention relates to new and improved means for treating carbohydrate esters, and more particularly relates to improved means for the treatment of nitrocellulose, cellulose acetate, nitrostarch, starch acetate, and other carbohydrate esters, for the purpose of desirably altering their chemical and physical characteristics. One of the objects of our invention is to afford new and improved means for the production of carbohydrate esters giving solutions of low viscosity when dissolved in appropriate solvent, without the use of autoclaves or the employment of super-atmospheric pressures. This application is a continuation in part of our pending application S. N. 298,393, filed Aug. 8, 1928 and refers to the treatment of other cellulose esters in addition to the treatment of the nitrated carbohydrates forming the principal subject matter of that application.

It has long been known that cellulose esters giving solutions of low viscosity could be obtained from ordinary cellulose esters by treating the ordinary ester in autoclaves with water maintained at a very high temperature and pressure.

By cellulose ester giving solutions of low viscosity, as used throughout this specification, is meant material which, when dissolved in a suitable solvent, gives a solution having relatively low viscosity, and in a similar way cellulose ester giving solutions of high viscosity is meant material which, when similarly dissolved in a suitable solvent, gives a solution having relatively high viscosity. For example, nitrocellulose which, when 12.2 grams of the dry nitrocellulose with 14.6 grams of denatured alcohol are dissolved in 29.2 grams of ethyl acetate and 44 grams of benzol, gives a solution of such viscosity that a steel ball having a diameter of .793 cm. to .797 cm, and weighing between 2.046 grams and 2.054 grams requires less than one-half second to fall through 10 inches of the solution in a cylinder 1 inch in diameter and 14 inches long at a temperature of 25° C. would be considered as nitrocellulose giving solutions of low viscosity.

By our present invention we are able to produce cellulose esters giving solutions of low viscosity from cellulose esters giving solutions of higher viscosity, in simple and inexpensive apparatus, and wholly without the use of super-atmospheric pressures. Our invention enables us to produce nitrocellulose and cellulose acetate giving solutions of low viscosity, for example, in a much cheaper and safer way than is possible by the autoclave method now in common use.

In its simplest form our invention comprises the heating to a suitable temperature of the ester of a carbohydrate in a high boiling chemically-inactive liquid in which the carbohydrate ester is insoluble, such heating being usually at a temperature in excess of 110° C., and preferably being at a temperature in excess of 120° C., and preferably being performed while the suspension is efficiently stirred.

All nitric acid esters are well known to be more or less unstable, and to decompose with the evolution of a considerable amount of heat. The treatment of intric acid esters in autoclaves, for the purpose of preparing nitrocellulose giving solutions of low viscosity has led to many accidents, probably due to incipient decomposition occurring in some portion of the material being treated, and the rapid acceleration of this initial decomposition as a result of the heat which is thereby generated. As the rate of decomposition of cellulose esters is greatly accelerated by heat, it will be noted that the action is self-accelerating, and may readily reach the point where the temperature within the autoclave is so great as to result in pressures greater than the apparatus can withstand.

By our present invention we may treat nitrocellulose in open vessels, or in closed vessels provided with means for reflux condensation but open to the atmosphere by suitable vent pipes, the significant element of our invention being the heating of a nitric acid ester to a temperature materially above the boiling point of water in the presence of a large excess of a chemically-inactive heat-ballasting liquid of high boiling point.

As one example of our present invention we may suspend 100 kg. of nitrocellulose (giving solutions having a viscosity as measured by the steel ball method of approximately six minutes) in 400 kg. of an ammonium nitrate solution containing 81% of ammonium nitrate and 19% of water. This ammonium nitrate solution has a boiling point of approximately 130° C., and may accordingly be readily heated to this temperature. We prefer to employ means for mechanical agitation, and to maintain the suspension of the nitrocellulose in the ammonium nitrate solution at a temperature of 130° C. for from 4 to 6 hours.

After separating the treated nitrocellulose from the excess of ammonium nitrate solution by any of the means well known to the art such as filtration followed by efficient washing to remove the last traces of ammonium nitrate, the resulting nitrocellulose will give solutions having a viscosity of less than one second but the viscosity can be varied over wide limits by suitable control of the concentration of the ammonium nitrate solution, the temperature of heating and the time of heating. For the production of nitrocellulose giving solutions of very low viscosity highly concentrated solutions should be employed, and a time of treatment of from 4 to 6 hours should be used, and a maintained temperature of from 130° C. to 132° C. is suitable. For the production of nitrocellulose giving solutions of medium viscosity a less concentrated solution of ammonium nitrate may be used, with either a shorter period of treatment or a lower temperature of treatment, or preferably with the employment of both a shorter period of treatment and a lower temperature. In general, the greater the concentration of the solution the higher the temperature that may be used, and the higher the temperature and the longer the duration of the treatment, the lower will be the viscosity of the solution of the resulting material.

In the operation of our process the solution in which the carbohydrate ester is treated, appears to have only a physical effect and if a chemical change takes place it occurs within the carbohydrate ester molecule. Instead of solutions of ammonium nitrate we may use other suitable solutions of high boiling point, such as a solution of calcium chloride in water for example. It will of course be evident that the relative proportions of carbohydrate ester and heat-ballasting liquid will depend somewhat upon the specific heat of the liquid which is used, but we find that an excess of the treating liquid does no harm, and accordingly we prefer to employ not less than four parts of heat-ballasting liquid to each part of carbohydrate ester undergoing treatment, and we may use from ten to twenty or more parts of liquid to each part of nitrated carbohydrate treated. If too small an amount of heat-ballasting liquid is employed, local over-heating may occur with "fuming off" of the charge, but the possibility of this occurrence can be entirely obviated by the use of a suitable amount of the heat-ballasting liquid, and it should be particularly pointed out that even in cases where a minimum of heat-ballasting liquid is employed (for the purpose of reducing the cost of the treating operation to the lowest possible minimum), the operation is still entirely safe and is free from explosion hazards, owing to the operating being conducted at normal atmospheric pressures, and in open vessels rather than in steel bombs or autoclaves.

Although we prefer to employ our treating liquid at a boiling temperature, it will be evident that there is no significance in such employment of a boiling temperature other than the convenient means of heat control which it offers. We may, for example, treat our nitrated carbohydrate in a suitable chemically-inert high-boiling salt solution, at any desired temperature above the temperature necessary to cause the production of nitrocellulose giving solutions of low viscosity but below the boiling point of the liquid employed. Employing a chemically-inactive heat-ballasting liquid which boils at the temperature which it is desired to employ in the treatment of the cellulose ester has a certain advantage however, and is to be preferred. By employing a treating liquid which boils at or slightly above the desired temperature range of treatment, any excess heat that may be produced from chemical decomposition of the cellulose ester, or that may be accidentally applied through overheating of the treating vessel, will produce evaporation of a portion of the liquid without any material increase in the temperature of the suspension if the vapor is refluxed. By employing a liquid of very high boiling point, at a temperature materially below its boiling point, any excess heat tends to increase the temperature of the suspension, and as has already been pointed out any increase in the temperature of the suspension tends to increase decomposition of the cellulose ester. Accordingly, the employment of a chemically-inactive heat-ballasting salt solution having a boiling point very close to the temperature desired for the treatment of the cellulose ester has the general effect of acting as a "safety valve" in the prevention of excessive temperatures and accelerated decomposition of the cellulose ester undergoing treatment.

Although our present invention is particularly applicable to the treatment of nitrocellulose, it may be employed with equal success to the production of esters of starch, dextrin, ivory nut meal, and like materials giving solutions of very low viscosity. In general, nitrostarch, nitrodextrin, nitrojute, nitrated ivory nut meal and like materials normally give solutions of low viscosity in the usual solvents, but our invention may be applied to the treatment of these materials where solutions of exceptionally low viscosity are desired. Our invention may also be applied to the treatment of other cellulose esters, resulting reduction in viscosity occurring similarly in all cases in much the same way that it has now been discovered that cellulose may itself be modified before esterification, and that the modified cellulose will give esters which, when dissolved in suitable solvents, give solutions having viscosities which bear a functional relationship to the viscosity of solutions of the original cellulose when dissolved in cuprammonium solution or other suitable solvent material. For example, a sample of cellulose acetate which in its original condition gave a solution in acetone having a viscosity of 49 seconds for a solution containing 2 grams of cellulose acetate in 10 grams of acetone, gave after treatment for four hours in a nitrate of ammonia solution at a temperature of 140° C. to 145° C. a product which, when 2 grams were dissolved in 10 grams of acetone showed a viscosity of but 1.2 seconds.

Cellulose xanthate (viscose) and other cellulose esters when similarly treated in accordance with the present invention show in all cases a modification which causes their solutions in suitable solvents to show lowered viscosity, and the extent of the change in viscosity of such solutions can be controlled over a wide range, increasing concentration of ammonium nitrate solution used, and increased time of treatment, both tending to cause reduction in the viscosity of solutions of the treated product in suitable solvent materials.

We claim:

The process of treating a carbohydrate ester which comprises heating a suspension of a carbohydrate ester in a large excess of a concentrated solution of ammonium nitrate having a boiling point of not lower than 110° C., to a temperature not lower than 110° C.

In testimony whereof, we have hereunto subscribed our names this 13th day of December, 1930.

WALTER O. SNELLING.
RICHARD N. BOYD.